(12) United States Patent
Kuwabara

(10) Patent No.: US 7,997,420 B2
(45) Date of Patent: Aug. 16, 2011

(54) FILTER APPARATUS CAPABLE OF RELEASING AIR

(75) Inventor: Hirokazu Kuwabara, Tokyo (JP)

(73) Assignee: Entegris, Inc., Billerica, MA (US)

( * ) Notice: Subject to any disclaimer, the term of this patent is extended or adjusted under 35 U.S.C. 154(b) by 150 days.

(21) Appl. No.: 12/438,049

(22) PCT Filed: Aug. 13, 2007

(86) PCT No.: PCT/JP2007/065814

§ 371 (c)(1),
(2), (4) Date: Apr. 1, 2009

(87) PCT Pub. No.: WO2008/023593

PCT Pub. Date: Feb. 28, 2008

(65) Prior Publication Data

US 2010/0000932 A1    Jan. 7, 2010

(30) Foreign Application Priority Data

Aug. 25, 2006   (JP) ................. 2006-229301

(51) Int. Cl.
*B01D 19/00* (2006.01)
*B01D 35/28* (2006.01)
*B67D 7/76* (2010.01)
*B01D 35/00* (2006.01)

(52) U.S. Cl. ............... 210/436; 210/359; 210/497.01; 210/541; 210/236; 210/542; 210/473; 210/455; 210/321.68; 210/188; 222/189.06; 222/189.09

(58) Field of Classification Search .......... 210/436, 210/321.68, 455, 473, 542, 359, 402, 403, 210/497.01, 541, 236, 244, 249, 188, 472; 222/189.06, 189.04, 189.11
See application file for complete search history.

(56) References Cited

U.S. PATENT DOCUMENTS

| 5,417,856 | A | 5/1995 | Bacher et al. | |
|---|---|---|---|---|
| 5,516,426 | A * | 5/1996 | Hull et al. | 210/256 |
| 6,582,598 | B2 * | 6/2003 | Patrovsky | 210/330 |
| 2005/0218047 | A1 * | 10/2005 | Taylor et al. | 210/85 |

FOREIGN PATENT DOCUMENTS

| EP | 547951 | 5/1995 |
|---|---|---|
| EP | 1 527 885 A1 | 5/2005 |
| FR | 2684894 | 6/1993 |

(Continued)

OTHER PUBLICATIONS

International Search Report from PCT/JP2007/065814.

(Continued)

*Primary Examiner* — Benjamin Kurtz
(74) *Attorney, Agent, or Firm* — Hamilton, Brook, Smith & Reynolds, P.C.

(57) ABSTRACT

A filter apparatus capable of releasing air from a filter body, comprising a filter body held by a holder. The filter body includes a fluid inlet and a fluid outlet. The filter body is disposed in the holder so as to rotate around an axis of rotation that passes through the fluid inlet. The holder includes a front panel. The front panel comprises engaging portions, for temporarily engaging the fluid outlet at either an air releasing position or at a filtering position, and a fixing means for fixing the filter body at each position. The filter apparatus further includes means for rotating the filter body.

12 Claims, 5 Drawing Sheets

| FOREIGN PATENT DOCUMENTS | | |
|---|---|---|
| JP | 7-85765 | 9/1995 |
| JP | 11-314016 | 11/1999 |
| JP | 2001-137618 | 5/2001 |
| JP | 2003-210912 | 7/2003 |
| JP | 2003210912 A * | 7/2003 |
| WO | WO 92/16351 | 10/1992 |

OTHER PUBLICATIONS

International Preliminary Report on Patentability for PCT/JP2007/065814.

Supplementary European Search Report, Application No. EP 07792457.9, dated Jan. 4, 2010.

* cited by examiner

FILTER APPARATUS CAPABLE OF RELEASING AIR

CROSS REFERENCES TO RELATED APPLICATIONS

This application is the National Stage Application under 35 U.S.C. §371 of International Application No. PCT/JP2007/065814, filed 13 Aug. 2007, which designates the United States and claims benefit of Japanese Patent Application No. 2006-229301, filed 25 Aug. 2006, the contents of each of these are incorporated herein by reference in their entirety.

TECHNICAL FIELD

The present invention relates to a filter apparatus used for a device that is operated through a discharge of a chemical solution by means of a pump, and more particularly, to a filter apparatus in which an air releasing operation, which is required before the chemical solution is discharged to the device, is simplified.

BACKGROUND ART

In an operating device of a type in which a chemical solution is discharged from a nozzle by means of a pump, the chemical solution passes preliminarily through a filter apparatus before the chemical solution is discharged from the nozzle in order to prevent troubles such as clogging of the nozzle due to the foreign matters in the chemical solution or blur or stain on the printed matter, or in order to suppress the change in the discharge amount caused by the inclusion of air into the discharge nozzle of the chemical solution. Although not particularly shown in the figures since it is out of the scope of the present invention, the operating device described above includes a dispenser cleaning device used in a semiconductor manufacturing machine or an ink filtering machine used in a printer.

FIGS. 9 and 10 are perspective views each showing a conventional filter apparatus 10. The filter apparatus 10 has a holder 12, and a generally cylindrical filter body 20 that is sandwiched between a front panel 16 and a rear panel 18, which extend upwardly from each of a front and rear side edge portions of a bottom panel 14 of the holder 12.

The filter body 20 is provided with a fluid inlet 22, which projects forwardly from the center position of the filter body 20 and into which a chemical solution to be filtered is injected, and a fluid outlet 24, which projects forwardly like the fluid inlet 22 at the position apart from the fluid inlet 22 in the radial direction and from which the filtered chemical solution passing through the filter body is discharged.

The front panel 16 of the holder 12 is formed with a single vertical cutout 26 through which the fluid inlet 22 and the fluid outlet 24 of the filter body 20 can simultaneously be inserted from above in a longitudinal direction. The front panel 16 and the rear panel 18 are biased in the direction in which they are close to each other so as to hold the filter body 20 therebetween. Therefore, when the filter body 20 is inserted between the front panel 16 and the rear panel 18 with the fluid inlet 22 and the fluid outlet 24 inserted into the vertical cutout 26, the filter body 20 is held between the front and the rear panels, and the fluid inlet 22 and the fluid outlet 24 inserted into the vertical cutout 26 fixes the filter so as not to rotate.

The filter body 20 is used during the operation of filtering the chemical solution in such a manner that the fluid outlet 24 is positioned below the fluid inlet 22 as shown in FIG. 10. Air included in the chemical solution flowing from the fluid inlet 22 moves upward in the filter body 20 to be trapped.

In order to eliminate the trapped air from the filter body 20, it is necessary to perform a series of operations as mentioned below. The filter body 20 having the fluid inlet 22 and the fluid outlet 24, to which the tubes are attached, is lifted up so as to temporarily remove the filter body 20 from the holder 12. Then, the filter body 20 is inversely rotated by 180° so as to position the fluid outlet 24 above the fluid inlet 22, and then, the filter body 20 is again inserted into the holder 12 from above so as to attach the filter body 20 to the holder 12. With this state, the air releasing operation is performed for a predetermined time. After the air releasing operation, the filter body 20 is again lifted up so as to remove the filter body 20 from the holder 12. Thereafter, the filter body 12 is inversely rotated by 180° so as to position the fluid outlet 24 below the fluid inlet 22. Then, the filter body 20 is inserted into the holder 12 from above so as to attach the filter body 20 to the holder 12. Thus, the filter body 20 is returned to the used state shown in FIG. 10.

However, during the air releasing operation described above, a user has to secure a physical space, which is necessary and sufficient for accessing to the holder 12, and lifting up the filter body 20 so as to remove the filter body 20 from the holder 12, in a limited space of the device, to which the filter apparatus 10 is incorporated, without interfering with a chemical solution bottle or other filtering-related components that are housed in the limited space. This produces a limitation upon making the whole apparatus compact. The operation, in which the filter body 20 is removed in the narrow and small space with the tubes connected to the fluid outlet 24 and the fluid inlet 22 respectively and this filter body 20 is inversely rotated by 180°, is a cause of deteriorating operability and workability related to the filter apparatus 10.

DISCLOSURE OF THE INVENTION

Problems to be Solved by the Invention

The subject of the present invention is to provide a filter apparatus for a chemical solution capable of releasing air, the filter apparatus having improved operability and workability relating to operations, such as an air releasing operation of the filter apparatus, by promoting a reduction in the size of the filter apparatus.

Means for Solving the Problems

The present invention provides a filter apparatus 1 capable of releasing air from a filter body, comprising:

a holder 3, 103, 203 having a front panel 5, 105, 205 and a rear panel 7, 107, 207, which are connected to each other by a connecting portion and stand in parallel with each other, wherein the front panel 5, 105, 205 has a center cutout 11, 111, 211;

a generally cylindrical filter body 13, 113, 213 sandwiched between the front panel 5, 105, 205 and the rear panel 7, 107, 207 of the holder 3, 103, 203 so as to be able to rotate around its axis of rotation, wherein the filter body 13, 113, 213 comprises a fluid inlet 15 located at the axis of rotation and rotatably held in the center cutout 11, 111, 211 of the front panel 5, 105, 205 of the holder 3, 103, 203, and a fluid outlet 17 located in the vicinity of the circumference of the filter body 13, 113, 213, wherein the front panel 5, 105, 205 of the holder 3, 103, 203 further comprises:

an engaging portion 19, 21 for temporarily engaging the fluid outlet 17 at an air releasing position and a filtering position, respectively, when the filter body 13, 113, 213 is rotated in a clockwise direction and counterclockwise direction about the axis of rotation with the fluid inlet 15 being held in the center cutout 11, 111, 211 of the holder 3, 103, 203;

fixing means 23, 25, 27 for temporarily fixing the filter body 13, 113, 213 at each engaging position so as not to rotate the filter body 13, 113, 213; and means 39, 139 for easily rotating the filter body 13, 113, 213.

In the representative embodiment of the present invention, the engaging portion comprises an upper cutout vertically above the center cutout and a lower cutout vertically below the center cutout. At each of the air releasing position and the position for filtering the chemical solution, the fixing means for temporarily fixing the filter body so as not to rotate the filter body comprises a first engaging member and a second engaging member integrally or separately formed on the front panel of the holder at locations above and below the center cutout, and a third engaging member formed on the filter body and snappily engageable with the first and the second engaging members.

The front panel and the rear panel of the holder are biased in the direction, in which they are close to each other, to hold the filter body rotatably between the front panel and the rear panel. The holder constitutes a mounting member for the filter body. The means for easily rotating the filter body comprises a circumferential rib formed along a circumferential direction of the filter body, or a lever extending outwardly from the filter body in the radial direction.

The lower inner peripheral edge of the center cutout of the holder extends upwardly at an angle $\alpha$ with respect to the horizontal direction. The width of the cutout between the upper inner peripheral edge and the lower inner peripheral edge is larger than the outer diameter of the fluid inlet.

In each embodiment, the connecting portion for connecting the front panel and the rear panel of the holder each other comprises any one of an upper panel, a side panel and a bottom panel of the holder.

The filter apparatus according to the present invention can be used in any operating devices of a type in which a chemical solution is discharged from a nozzle by means of a pump. The operating device can include a dispensing machine used in a semiconductor manufacturing machine or an ink filtering machine used in a printer.

Effect of the Invention

Upon executing the assembling operation to the holder or the air releasing operation, it is unnecessary to lift up the filter body from the holder. Further, the filter body can be accessed to the holder from the lateral direction so as to attach or detach the filter body to the holder, whereby it becomes unnecessary to secure the space above the holder. Accordingly, the assembling operation of the filter apparatus and the air-releasing operation are easier to be performed, and the whole device is more downsized. Moreover, the filter apparatus according to the present invention effectively prevents the twist of the piping components, which is inevitably produced by the operation of lifting up the filter body from the holder as is conventionally done, and the damage of the piping components or falling-off of the piping components from the fluid inlet and the fluid outlet caused by the stress of the twist. Therefore, the workability is improved. The operability is enhanced by a click touch produced when the fluid inlet and the fluid outlet are temporarily engaged with the center cutout, upper cutout, and the lower cutout respectively. In the embodiment in which a turning handle member is provided to the filter body, the workability is further enhanced. Thus, the present invention provides a filter apparatus for an industrial use having the above-mentioned effects.

Best Mode for Carrying Out the Invention

Three embodiments of the present invention will be described in detail below with reference to FIGS. 1 to 5.

FIG. 1 illustrates a filter apparatus capable of releasing air according to a first embodiment of the present invention. The whole filter apparatus is indicated by a numeral 1. The filter apparatus 1 has a holder 3. The holder 3 includes a front panel 5 and a rear panel 7 standing in parallel with each other. The front panel 5 and the rear panel 7 are connected with each other by a connecting portion constituting an upper panel 9 of the holder in the present embodiment. In the present invention, the front panel 5 of the holder 3 is provided with a center cutout 11 for rotatably engaging a fluid inlet at the position corresponding to the fluid inlet of the filter body when the filter body is mounted to the holder 3, as described later, not a single elongated U-shaped cutout in a conventional filter apparatus.

The filter body 13 has a structure and shape generally similar to those of the conventional holder shown in FIGS. 9 and 10. The filter body 13 is generally cylindrical, and has a size and shape by which the filter body 13 is rotatably sandwiched between the front panel 5 and the rear panel 7 of the holder 3 that are biased in the direction in which they are close to each other. The filter body 13 is located at a predetermined position due to the biasing force of the front panel 3 and the rear panel 5 of the holder 3, in the direction in which they are close to each other in a normal state. The filter body 13 has a fluid inlet 15 into which a chemical solution that passes through the filter body 13 to be filtered is injected. The fluid inlet 15 is arranged at the position corresponding to an axis of rotation of the filter body 13. The filter body 13 also has a fluid outlet 17 in the vicinity of the circumference for feeding the filtered chemical solution to a nozzle from the filter body 13 or for discharging air accumulated in the filter body 13.

The holder 3 also has an engaging portion comprising an upper cutout 19 and a lower cutout 21, The engaging portion temporarily engages the fluid outlet 17 at the locations above and below the center cutout 11 in the vertical direction, when the fluid inlet 15 of the filter body 13 is engaged in the center cutout 11 and rotatably held in the center cutout 11, and then the filter body 13 is rotated in a clockwise direction and counterclockwise direction about the axis of rotation of the fluid inlet 15 within the range of 180°.

The upper cutout 19 and the lower cutout 21 constituting the engaging portion are formed at each of the 180° locations above and below the center cutout 11 of the front panel 5 of the holder 3 as shown in embodiments of FIGS. 1 to 4. Each of the upper cutout 19 and the lower cutout 21 can have, for example, a size and shape in which the fluid outlet 17 can go over the opening edge along the inner peripheral portion thereof as being in contact therewith in order to temporarily engage the fluid outlet 17 with a light click touch.

On the one hand, a first engaging member 23 and a second engaging member 25 are formed on the front panel 5 of the holder 3 at locations above and below the center cutout 11 and toward the inside in the circumferential direction from the fluid inlet 15 and the fluid outlet 17. The first engaging member 23 and the second engaging member 25 (in the present embodiment, two small members cut out into a plate spring) for temporary engaging so as to prevent the filter body 13 from rotating at each engaging position that is an air releasing position and chemical-solution filtering position are formed integral with the holder 3. On the other hand, a third engaging member 27 (in the present embodiment, a small projection) that is snappily engageable with the first engaging member 23 and the second engaging member 25 is formed at the position of the filter body 13 corresponding to the first engaging member 23 and the second engaging member 25. When the fluid outlet 17 is temporarily engaged in each cutout, the small projection 27 serving as the third engaging member is engaged with a concave portion 31 formed between two small members 29 cut out into a plate spring to produce a click touch. This click touch enhances the operability upon engaging the fluid outlet 17 with the upper cutout 19 and the lower cutout 21. Further, since the fluid outlet 17 is temporarily engaged in each cutout, and at the same time, the first engaging member 23 and the second engaging member 25 are engaged with the third engaging member 27, the holding performance of the fluid outlet 17 at the upper cutout 19 and the lower cutout 21 is further enhanced.

The front panel 5 and the rear panel 7 of the holder are connected with the upper panel 9 in such a manner that they are biased in the direction in which they are close to each other by a predetermined distance, whereby the filter body 13 are effectively sandwiched and held between the front panel 5 and the rear panel 7, when the filter body 13 is inserted between the front panel 5 and the rear panel 7. In the illustrated embodiment, the holder 3 constitutes a mounting member of the filter body 13. At the bottom of the holder 3, plural small holes 33, to which a screw or the like for fixing the holder 3 to an unillustrated filter unit is mounted, are formed at appropriate positions of four corners of a bottom plate 3.

Further, a rib 39 is formed. along a portion of the filter body 13 in the circumferential direction in the present embodiment as means for easily rotating the filter body 13 when the fluid outlet is arranged at the temporal engaging position. The rib 39 includes a great number of grooves in the radial direction as illustrated in the figure in order to surely transmit the force generated by pressing the rib 39 with fingers for rotation.

The center cutout 11 formed on the front panel 5 of the holder 3 includes a lower inner peripheral edge 35 (FIG. 1) that extends upwardly with respect to the horizontal direction at an angle α. By virtue of this structure, the fluid inlet 15 is held by the lower inner peripheral edge 35, so that the width of the center cutout 11 between the upper inner peripheral edge 37 and the lower inner peripheral edge 35 can be made larger than the outer diameter of the fluid inlet 15. Accordingly, the attaching and detaching operation of the filter body 13 to the holder 3 is more facilitated.

FIG. 3 shows a filter apparatus according to a second embodiment of the present invention. The whole filter apparatus is indicated by a numeral 101. In the case of the filter apparatus 101, the fluid outlet 17 is temporarily engaged with an upper cutout 119 and a lower cutout 121. The fluid outlet 17 is temporarily engaged with each cutout, and at the same time, the third engaging member 27 is engaged with the first engaging member 23 and the second engaging member 25. A holder 109 has a front panel 105 and a rear panel 107 standing in parallel with each other, like the first embodiment. A center cutout 111 formed on the front panel 105 has a lower inner peripheral edge 35 extending upwardly with respect to the horizontal direction at an angle α. The width of the center cutout 11 between the upper inner peripheral edge 37 and the lower inner peripheral edge 35 is made larger than the outer diameter of the fluid inlet 15, so that attaching and detaching operation of the filter body 113 to the holder 103 can he more facilitated. On the other hand, the front panel 105 and the rear panel 107 of the holder 103 are connected to each other by a connecting portion constituting a side panel 109 of the holder, not the upper panel of the holder, in the present embodiment.

In the second embodiment, a lever 139 extending outwardly in the radial direction along the longitudinal direction of the filter body 113 is attached to the holder 103 as the means for more easily rotating the filter body 113. The lever 139 is positioned to the filter body 113 at the location in a range that does not affect the gripping operation with fingers for temporarily engaging the fluid outlet 17 with the upper cutout 119 and the lower cutout 121 in such a manner that the lever 139 operates without being in contact with an unillustrated base portion to which the filter apparatus is installed or the side panel 109 serving as the connection portion for connecting the front panel and the rear panel.

FIG. 5 shows a filter apparatus 201 according a third embodiment of the present invention. In the case of the filter apparatus 201, the fluid outlet 17 is temporarily engaged with an upper cutout 219 and a lower cutout 221 also shown in FIG. 4 as 121), like the first and second embodiments. The fluid outlet 17 is temporarily engaged with each cutout, and at the same time, the third engaging member 27 is engaged with the first engaging member 23 and the second engaging member 25. A holder 203 has a front panel 205 and a rear panel 207 standing in parallel with each other. A center cutout 211 (also shown in FIG. 4 as 111) formed on the front panel 205 has a lower inner peripheral edge 35 extending upwardly with respect to the horizontal direction at an angle .alpha. The width of the center cutout 211 between the upper inner peripheral edge 37 and the lower inner peripheral edge 35 is made larger than the outer diameter of the fluid inlet 15, so that attaching and detaching operation of the filter body 213 to the holder 203 can be more facilitated. On the other hand, the front panel 205 and the rear panel 207 are connected to each other by a connecting portion constituting a bottom panel 209 of the holder, not the upper panel or the side panel of the holder, in the present embodiment.

Although not illustrated in the figures, in this third embodiment of the present invention, the rib-like member described in the first embodiment or the lever-like member described in the second embodiment may be provided at the circumferential position of the filter body 213 in order to easily rotate the filter body.

A procedure for newly attaching a filter body to a holder in the filter apparatus according to the embodiment shown in FIGS. 1 and 2, among the filter apparatuses shown in FIGS. 1 to 5, and the used state thereof will be described below with reference to FIGS. 6 to 8.

(1) Attachment of Filter Body to Holder:

Firstly, the filter body 13 having unillustrated tubes attached to the fluid inlet 15 and the fluid outlet 17 is positioned so as to be held between the front panel 3 and the rear panel 7 of the holder 3, before the filter body 13 is attached to the holder 3. Then, the fluid inlet 15 of the filter body 13 is moved closer to the center cutout 11 of the holder 3 in the lateral direction, and the fluid inlet 15 is engaged with the center cutout 11 with maintaining the state, whereby the fluid inlet 15 is rotatably held in the center cutout 11, and the filter body 13 itself is sandwiched by the holder 3. Thus, the filter apparatus is in the state shown in FIG. 6. In this case, the fluid outlet 17 of the filter body 13 is positioned so as to be horizontal to the fluid inlet 15, but the fluid outlet 17 may be located at the other position.

(2) Arrangement to Initial Air-releasing Position

After the filter body 13 is attached to the holder 3 as described above, the filter body is firstly rotated in the clockwise direction to temporarily engage the fluid outlet 17 with the upper cutout 19 as shown in FIG. 8, whereby the fluid outlet 17 is located at the initial air releasing position. Then, when a chemical solution is fed into the filter body 13 from the fluid inlet 15 at the initial air releasing position, the air accumulated in the filter body at the beginning of mounting the filter body is discharged from the fluid outlet 17 as the chemical solution is gradually accumulated into the filter body. This operation is ended when the air is completely released.

(3) Arrangement to Normal Use Position:

Subsequently, the filter body 13 sandwiched by the holder 3 is rotated in the counterclockwise direction about an axis of rotation of the fluid inlet 15 within the range of 180° above and below the fluid inlet 15 at the left side in FIG. 7 as shown with an arrow, so that the fluid outlet 17 is temporarily engaged with the lower cutout 21, which is vertically below the center cutout 11, with an appropriate click touch. Accordingly, the filter body is in the normal use position for filtering the chemical solution as shown in FIG. 7.

The fluid outlet 17 is temporarily engaged with the lower cutout 21, and at the same time, the third engaging member 27 of the filter body 13 is engaged with the second engaging member 25 at the front panel 5 of the holder 3. Thus, the fluid outlet 17 is temporarily engaged in the lower cutout 21, so that the filter body 13 is satisfactorily fixed temporarily and held at the chemical-solution filtering position. Then, a series of chemical-solution filtering operation is executed as described below. Specifically, the chemical solution to be filtered is fed into the filter body 13 through the fluid inlet 15. After the chemical solution is filtered in the filter body, the filtered chemical solution is fed to the discharge nozzle through the fluid outlet 17 and the tube connected to the fluid outlet 17.

(4) Arrangement to Air Releasing Position

After the operation device is used for a predetermined time, the filter body 13 sandwiched by the holder 3 is then rotated in the clockwise direction about the axis of rotation of the fluid inlet 15 within the range of 180° above and below the fluid inlet 15 at the left side in FIG. 8, whereby the fluid outlet 17 is disengaged from the lower cutout 21, and at the same time, the third engaging member 27 of the filter body 13 is disengaged from the second engaging member 25 at the front panel 5 of the holder 3. Then, the fluid outlet 17 is further rotated in the clockwise direction so as to temporarily engage the fluid outlet 17 in the upper cutout 19, which is vertically above the center cutout 11, with an appropriate click touch to position the fluid outlet 17 at the air releasing position again. In this case, the third engaging member 27 of the filter body 13 is snappily engaged with the first engaging member 23 at the front panel 5 of the holder 3. Accordingly, the resistance of the filter body 13 to the stress of twist of the tube caused upon inversing the filter body 13 to the air releasing position is increased due to the temporal engagement of the fluid outlet 17 with the upper cutout 19, whereby the filter body 13 is satisfactorily fixed temporarily and held at the air releasing position.

When the filter body 13 is positioned at the air releasing position, the air foams accumulated in the filter body 13 move at the upper portion of the filter body 13. Therefore, the air is released from the filter body 13 through the fluid outlet 17 and the unillustrated tube connected to the fluid outlet.

(5) Rearrangement to Chemical-solution Filtering Position

After the air releasing operation from the filter body 13 is ended, the filter body 13 is rotated in the counterclockwise direction about the axis of rotation of the fluid inlet 15 within the range of 180° above and below the fluid inlet 15 at the left side in FIG. 7. With this operation, the third engaging member 27 of the filter body 13 is disengaged from the first engaging member 23 at the front panel 5 of the holder 3 so as to remove the fluid outlet 17 from the upper cutout 19, and at the same time, the third engaging member 27 is disengaged from the first engaging member 23. Then, the fluid outlet 17 is further rotated in the counterclockwise direction so as to temporarily engageably hold the fluid outlet 17 in the lower cutout 21, which is vertically below the center cutout 11, with an appropriate click touch to position the filter body 13 at the chemical-solution filtering position again, and at the same time, to snappily engage the third engaging member 27 of the filter body 13 with the second engaging member 25 at the front panel 5 of the holder 3. Thus, the fluid outlet 17 is temporarily engage in the lower cutout 19, so that the filter body 13 is satisfactorily fixed temporarily and held at the chemical-solution filtering position. Then, the chemical-solution filtering operation is restarted as described above. Specifically, the chemical solution to be filtered is fed into the filter body 13 from the fluid inlet 15. After the chemical solution is filtered in the filter body 13, the filtered chemical solution is fed to the operating device through the fluid outlet 17 and the tube connected to the fluid outlet 17.

As described above, the present invention does not need to secure the upper space, which is conventionally required in an equivalent apparatus for mounting a filter body to a holder, and does not need the removing operation of the filter body from the holder upon the air releasing operation. Therefore, the whole apparatus having the filter incorporated therein can further be downsized. Moreover, the workability can be improved, and in addition, there is no fear of the filter body and the related components being damaged due to the twist of the tube involved with the removing operation. The fluid inlet and the fluid outlet are not inserted to the cutout of the holder from above, but they are rotated on side to temporarily engage them into the upper and lower cutouts. Accordingly, the operability upon arranging the filter body at the operating position for releasing air and the operation position for filtering the chemical solution is dramatically enhanced. Further, since the fluid inlet and the fluid outlet are engaged or disengaged with or from the central cutout, the upper cutout and the lower cutout with an appropriate click touch, the operability is further enhanced.

The present invention has been described with reference to the embodiments. It is to be understood that various modifications are possible within the scope of the present invention.

Figure 1:
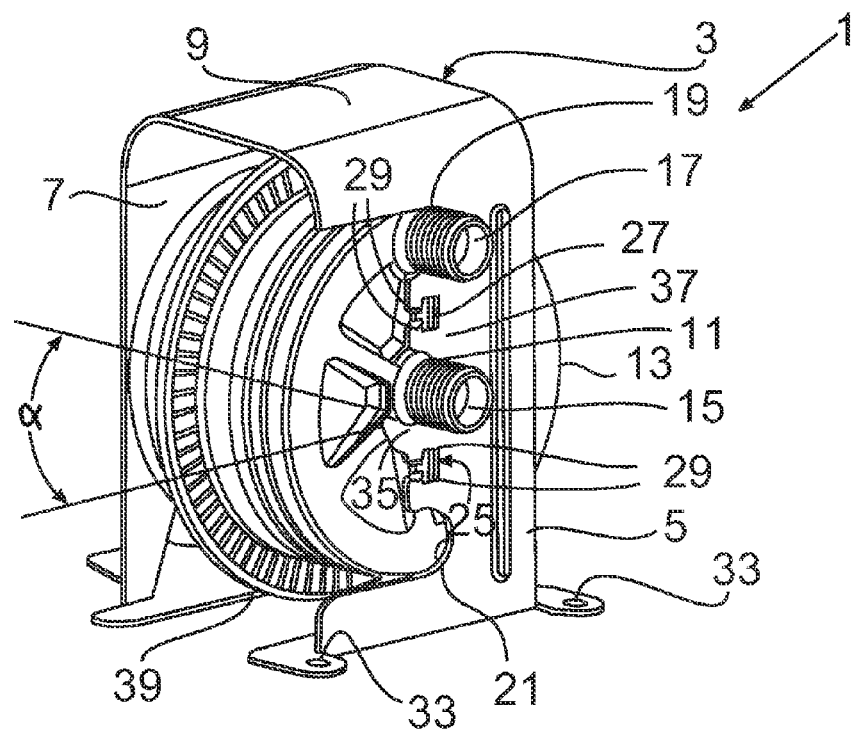
FIG. 1 is a perspective view showing a filter apparatus capable of releasing air according to a first embodiment of the present invention.
Figure 2:
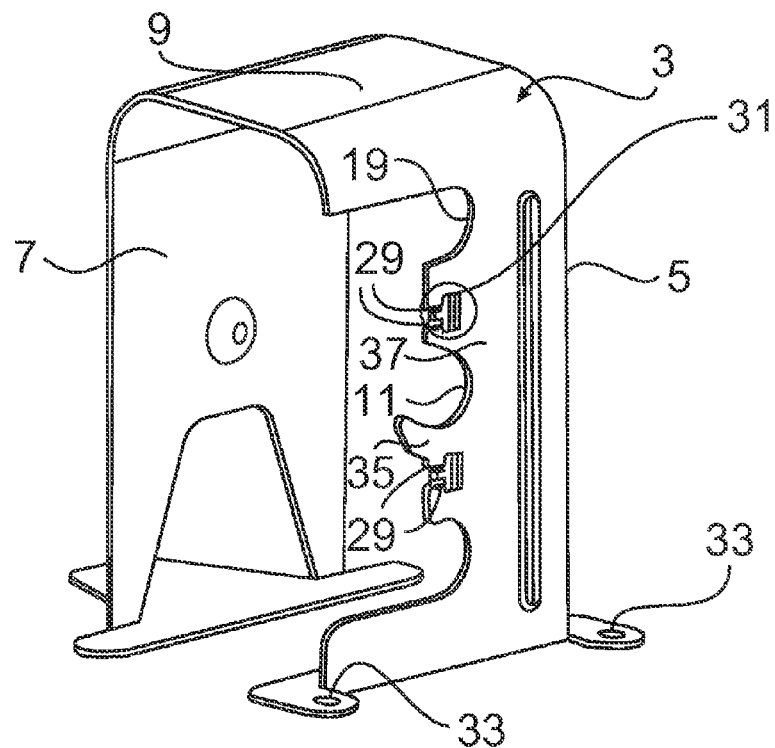
FIG. 2 is a perspective view of a holder of the filter apparatus shown in FIG. 1.
Figure 3:
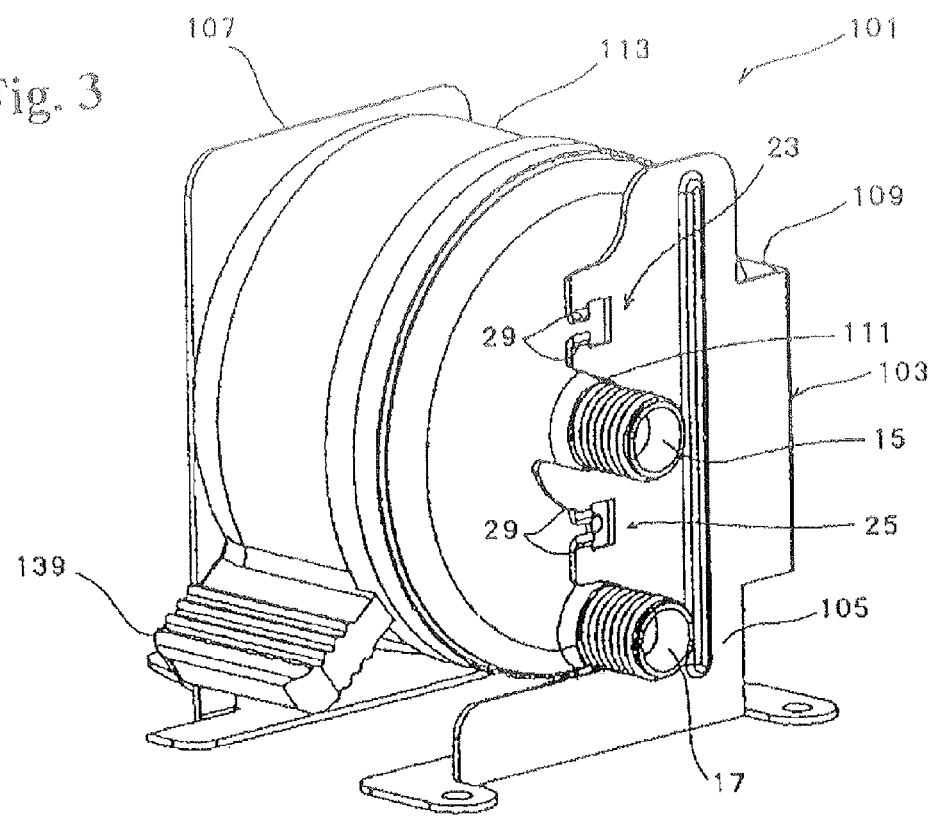
FIG. 3 is a perspective view showing a filter apparatus capable of releasing air according to a second embodiment of the present invention.
Figure 4:
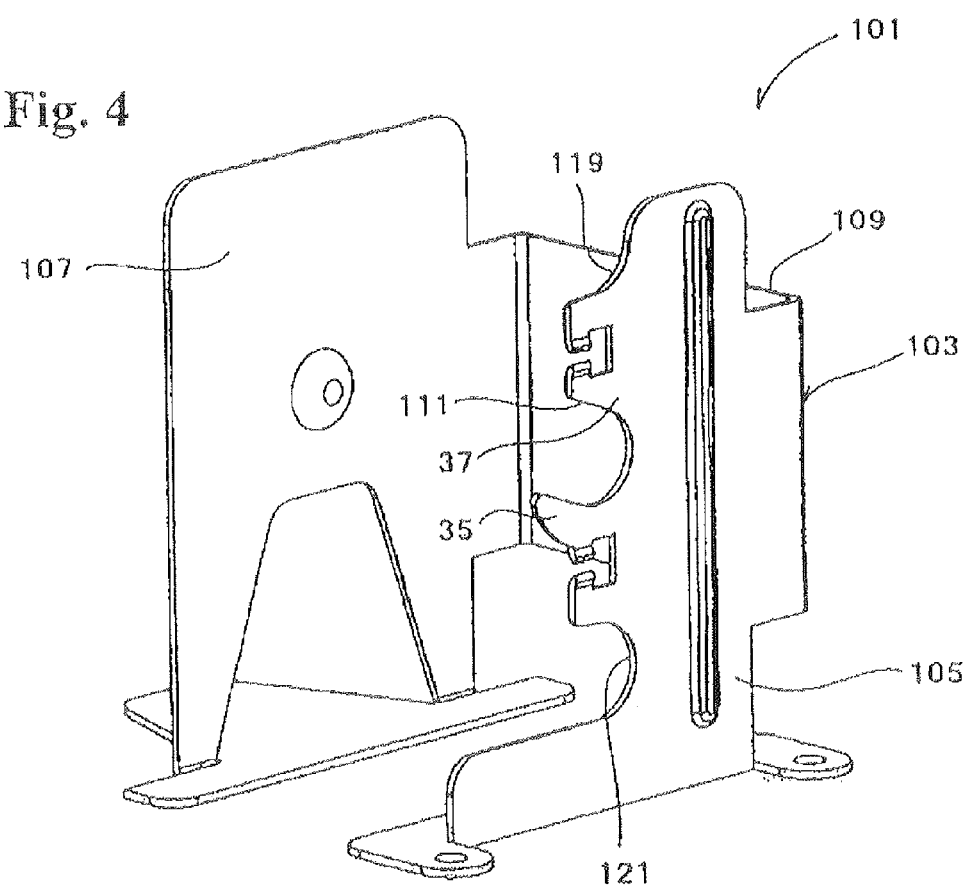
FIG. 4 is a perspective view of a holder of the filter apparatus shown in FIG. 3.
Figure 5:
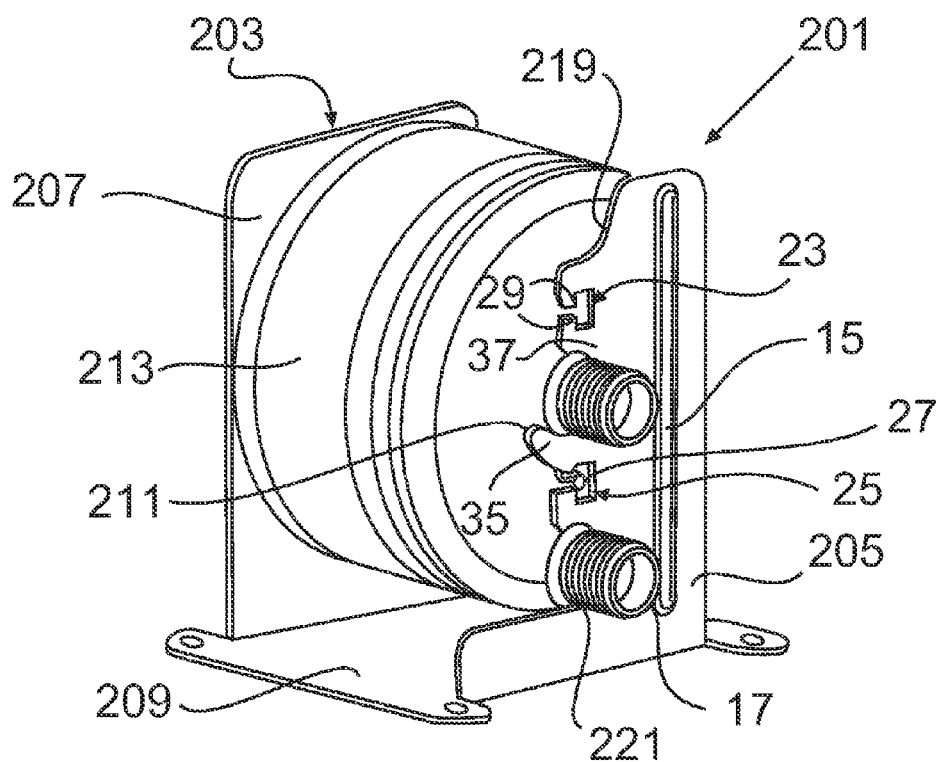
FIG. 5 is a perspective view showing a filter apparatus capable of releasing air according to a third embodiment of the present invention.
Figure 6:
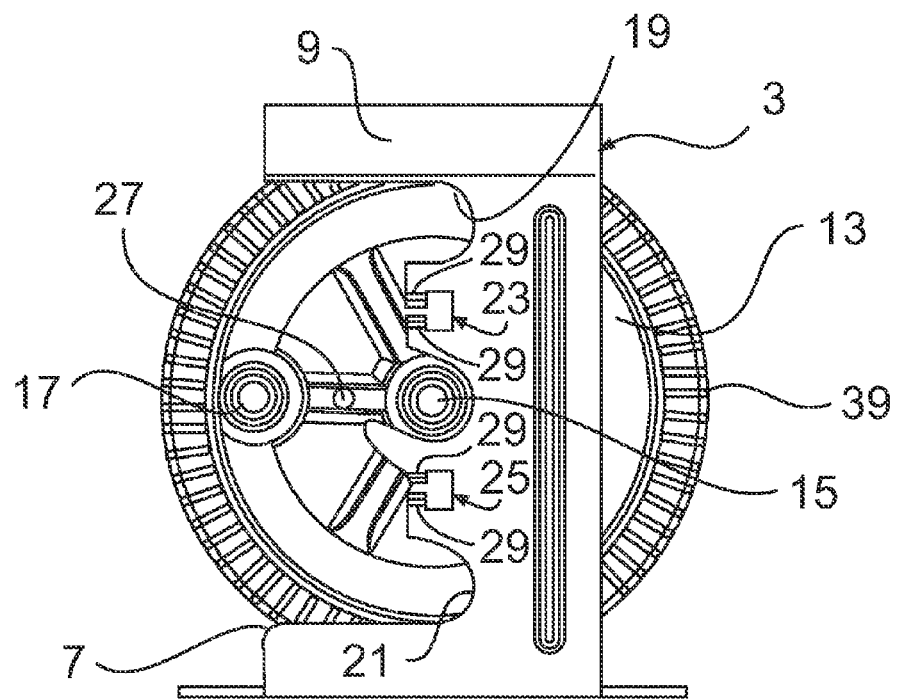
FIG. 6 is a front view showing a combined state of a filter body and a holder in a filter apparatus capable of releasing air according to the present invention.
Figure 7:
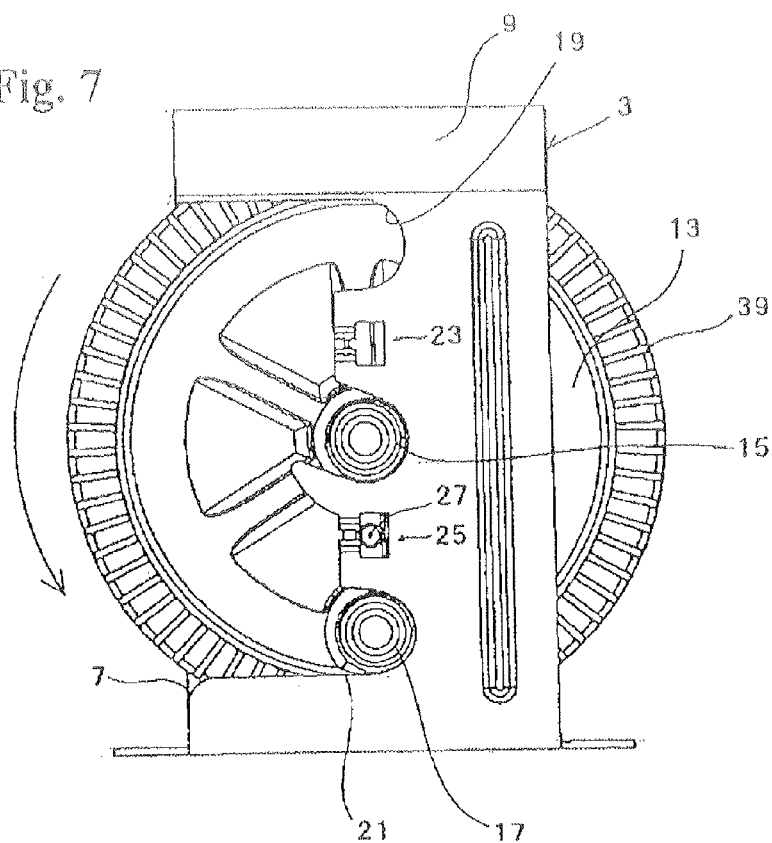
FIG. 7 is a front view showing the filter apparatus shown in FIG. 1 when the fluid outlet is located at a filtering position.
Figure 8:
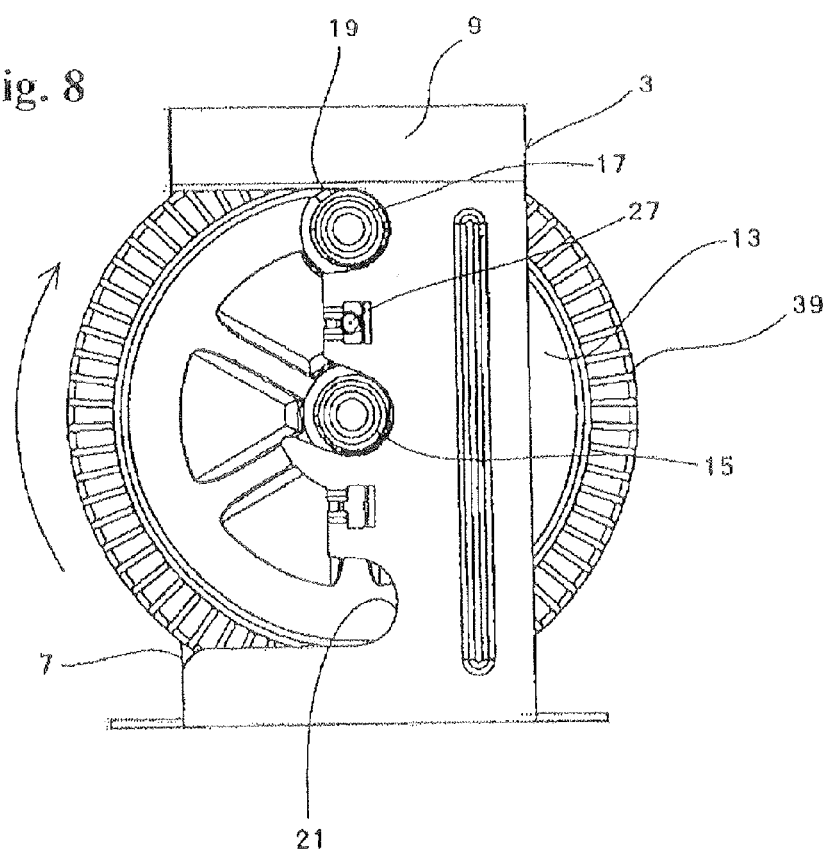
FIG. 8 is a front view showing the filter apparatus shown in FIG. 1 when the fluid outlet is located at an air releasing position.
Figure 9:
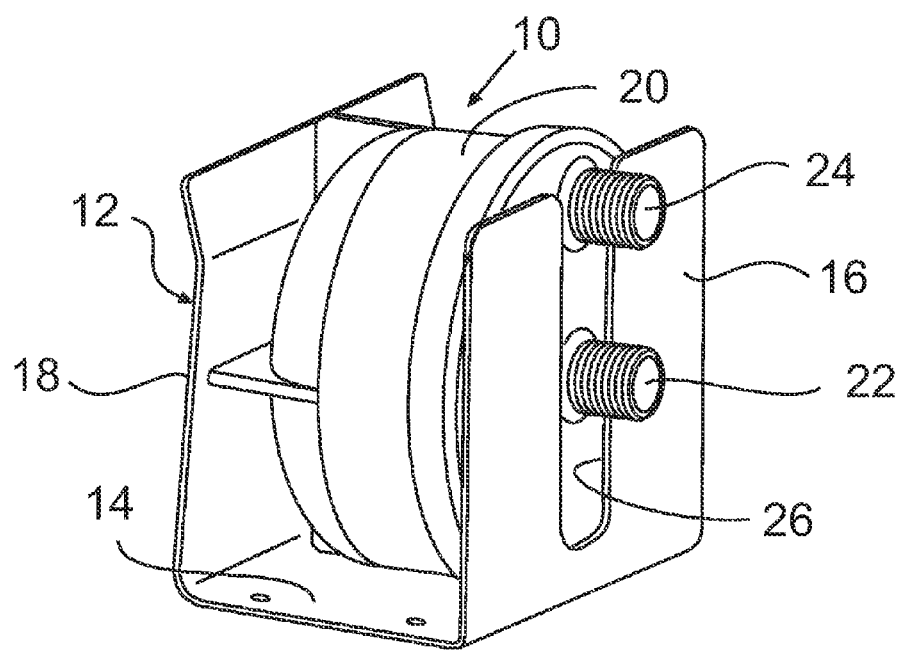
FIG. 9 is a perspective view showing a conventional filter apparatus capable of releasing air when a fluid outlet is located at an air releasing position.
Figure 10:
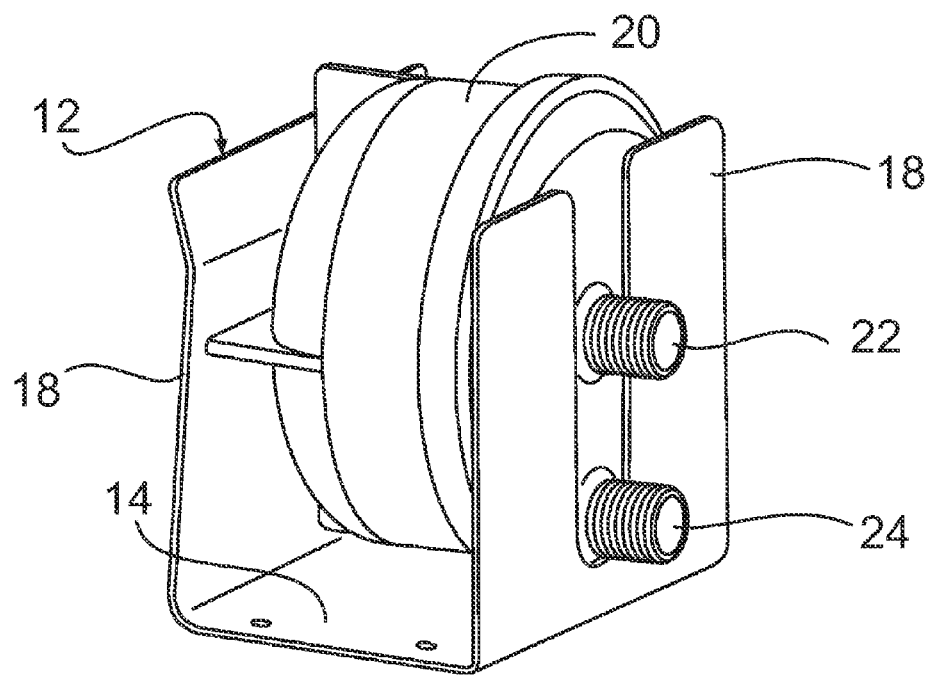
FIG. 10 is a perspective view showing the apparatus shown in FIG. 9 when the fluid outlet is located at the filtering position.

EXPLANATION OF REFERENCE NUMERALS 1, 101, 201 Filter apparatus
3, 103, 203 Holder
5, 105, 205 Front panel
7, 107, 207 Rear panel
9 Upper panel
11, 111, 211 Center cutout
13, 113, 213 Filter body
15 Fluid inlet
17 Fluid outlet
19 Upper cutout
21 Lower cutout
23 First engaging member
25 Second engaging member
27 Third engaging member
33 Small hole
35 Lower peripheral inner edge
37 Upper peripheral inner edge
39 Rib
109 Side panel
139 Lever
209 Bottom panel

The invention claimed is:

1. A filter apparatus capable of releasing air from a filter body, comprising:
    a holder having a front panel and a rear panel, which are connected to each other by a connecting portion and stand in parallel with each other, wherein the front panel has a center cutout;
    a generally cylindrical filter body sandwiched between the front panel and the rear panel of the holder so as to be able to rotate around its axis of rotation, wherein the filter body comprises a fluid inlet located at the axis of rotation and rotatably held in the center cutout of the front panel of the holder, and a fluid outlet located in the vicinity of the circumference of the filter body,
    wherein the front panel of the holder further comprises:
    an engaging portion for temporarily engaging the fluid outlet at an air releasing position and a filtering position, respectively, when the filter body is rotated in a clockwise direction and counterclockwise direction about the axis of rotation with the fluid inlet being held in the center cutout of the holder;
    fixing means for temporarily fixing the filter body at each engaging position so as not to rotate the filter body; and means for easily rotating the filter body.

2. A filter apparatus according to claim 1, wherein the engaging portion comprises an upper cutout vertically above the center cutout and a lower cutout vertically below the center cutout.

3. A filter apparatus according to claim 1, wherein the fixing means for temporarily fixing the filter body so as not to rotate the filter body at each engaging position comprises a first engaging member and a second engaging member integrally or separately formed on the front panel at locations, which are above and below the center cutout and inner side from the fluid inlet and the fluid outlet in the radial direction, and a third engaging member formed at the corresponding position on the filter body and snappily engageable with the first engaging member and the second engaging member.

4. A filter apparatus according to any one of claim 1, wherein the front panel, and the rear panel of the holder are biased in the direction, in which they are close to each other, to hold the filter body between the front panel and the rear panel.

5. A filter apparatus according to any one of claim 1, wherein the holder constitutes a mounting member for the filter body.

6. A filter apparatus according to any one of claim 1, wherein the lower inner peripheral edge of the center cutout of the front panel of the holder extends upwardly at an angle ($\alpha$) with respect to the horizontal direction, and the width of the cutout between the upper inner peripheral edge and the lower inner peripheral edge of the center cutout is larger than the outer diameter of the fluid inlet.

7. A filter apparatus according to any one of claim 1, wherein the means for easily rotating the filter body comprises a circumferential rib formed along a circumferential direction of the filter body, or a lever extending outwardly from the filter body in the radial direction.

8. A filter apparatus according to any one of claim 1, wherein the connecting portion for connecting the front panel and the rear panel of the holder each other comprises any one of an upper panel, a side panel and a bottom panel of the holder.

9. A filter apparatus capable of releasing air from a filter body, comprising:
    a holder having a front panel and a rear panel, the front panel and the rear panel are biased in a direction, in which they are close to each other and hold a generally cylindrical filter body that has an axis of rotation, said filter body has a fluid inlet located at the axis of rotation and a fluid outlet located in the vicinity of the circumference of the filter body; the front panel of said holder has a center cutout, an upper cutout, and a lower cutout; the upper cutout and the lower cutout are formed at each of the 180° locations above and below the center cutout of the front panel of the holder; the upper cutout and the lower cutout have a size and shape to temporarily engage the fluid outlet of said filter body;
    the front panel of the holder has a first engaging member and a second engaging member for temporarily engaging the fluid outlet of said filter body at an air releasing position and a filtering position, respectively, when the filter body is rotated in a clockwise direction and counterclockwise direction about the axis of rotation of the filter body with the fluid inlet being held in the center cutout of the holder.

10. The filter apparatus of claim 9 further comprising a generally cylindrical filter body.

11. A device, comprising:
    a pump;
    a nozzle; and
    the filter apparatus of claim 1, wherein the fluid inlet of the filter apparatus is in fluid communication with the pump and the fluid outlet of the filter apparatus is in fluid communication with the nozzle.

12. The device of claim 11, wherein the device is a semiconductor manufacturing dispensing machine or a printer ink filtering machine.

* * * * *